WITNESSES

Edwin E. Bassler

Laurence L. Lerner

INVENTOR

Raymond J. Radus

BY R. S. Brodahl

ATTORNEY

Jan. 12, 1965 R. J. RADUS 3,165,723

MAGNETIC MEMORY DEVICE

Filed Jan. 19, 1962 2 Sheets-Sheet 2

3,165,723

MAGNETIC MEMORY DEVICE

Raymond J. Radus, Monroeville, Pa., assignor to Westinghouse Electric Corporation, East Pittsburgh, Pa., a corporation of Pennsylvania Filed Jan. 19, 1962, Ser. No. 167,361
6 Claims. (Cl. 340—174)

In general this invention relates to a magnetic memory device and more particularly to a magnetic memory device which utilizes zone reluctance control to change the state of the memory.

The magnetic memory device of the present invention is an improvement upon the subject matter described in a copending application, Serial No. 167,359, filed January 19, 1962, by Richard D. Olson, Raymond J. Radus and Marc A. Nerenstone and assigned to the same assignee, which utilized the inherent characteristics of soft ferromagnetic materials to achieve the memory function.

A ferromagnetic material must have atoms whose electron arrangement is such that magnetism is created. The atoms having these magnetic characteristics are grouped into regions called domains. In these domains it is equally probable that magnetism will occur in any one of six directions. In the iron crystal, for example, the atoms are at the corner of a cubed shaped domain with one at the center. This arrangement is called a body center cubic lattice. The grouping in a nickel crystal differs from this by having an atom in the center of each face but none at the center of the cube. This is called a face centered cubic lattice. The domain in an iron crystal in the absence of an external magnetizing force has its atomic magnetic moments all lined up in a single direction, the direction of one of the edges of the cubic lattice. In a face center crystal lattice such as nickel the atomic magnetic moments are in the direction of a diagonal of a cube. In unmagnetized ferromagnetic materials the domains are randomly oriented and neutralize each other. However, the magnetic forces are present. Application of an external magnetic field causes magnetism in the domains to be aligned so that their magnetic moments are added to each other and to that of the applied field. In double oriented magnetic sheet, the cubic lattice of an iron alloy is on face, that is, the cube has four edges oriented in the direction of rolling of the sheet and four cube edges oriented in the crosswise direction. Therefore, the best magnetic properties are obtained in both directions because the easiest direction of magnetization of the domains is in a direction parallel to these edges. Consequently, a magnetic sheet comprising all cubes on face will exhibit highest magnetic properties in both direction of rolling and in a direction transverse thereto. Such a magnetic material and the method of producing it is shown in U.S. Patent 2,992,951, to Robert G. Aspden.

With soft magnetic materials such as iron small external fields will cause great alignment but because of the small restraining force only a little of the magnetism will be retained when the external field is removed. With hard magnetic materials a greater external field must be applied to cause orientation of the domains, but most of the orientation will be retained when the field is removed thus creating a larger permanent magnet which will have one north and one south pole. Materials which may be grouped as soft range from cast iron which is one of the poorest to the iron-nickel alloys which rank among the best. Alnico and barium ferrite are examples of hard magnetic materials.

The present invention utilizes the above-mentioned characteristics of soft magnetic materials by providing two or more ferromagnetic paths having a common portion. A source of magnetomotive force such as a permanent magnet is used to supply flux to each of the paths. If one path has less reluctance than the other paths, the majority of the domains in the above-mentioned common portions will align themselves in the direction of the path having the least reluctance. They will remain so aligned until some external energy is applied to realign them in a different direction. Control of the external energy required to rotate the domain orientation in the common portion is all that is necessary to classify the device as a memory unit. In the present invention this domain orientation is accomplished by zone reluctance control of each of the paths. This zone reluctance control is accomplished by providing a source of magnetomotive force in quadrature spatial relation to a portion of one of the paths. This source of magnetomotive force can be a permanent magnet whose force may be controlled by opening or closing an air gap in series with the permanent magnet source. The magnetomotive source might also be electromagnetic in nature. Double oriented magnetic materials are better suited to the applications of the present invention. The domains in such magnetic materials are easily aligned in the direction of the ferromagnetic path while the reluctance of a portion of this magnetic path can be easily magnetized in a direction in quadrature spatial relation to the ferromagnetic path by the above-mentioned source of magnetomotive force. The magnetic memory function of the present invention may be used to control the effective impedance of control windings on a saturable reactor associated with one of the ferromagnetic paths so as to continuously monitor the effective reluctance of its associated ferromagnetic path.

It is the general object of this invention to provide a more simple magnetic memory device.

Another object is to provide a more simple magnetic memory device which remembers the orientation of the domains in a common portion of a plurality of ferromagnetic paths until at least one of the ferromagnetic paths has the reluctance of a portion thereof changed by an external magnetomotive source.

Another object of this invention is to provide a more simple magnetic memory device which utilizes the domain characteristics of double oriented soft magnetic materials.

Still further objects and the scope of applicability of the present invention will become apparent from the detailed description given hereinafter. It should be understood, however, that the detailed description while indicating preferred embodiments of the invention is given by way of illustration only since various changes and modifications within the spirit and scope of the invention will become apparent to those skilled in the art from this detailed description.

For a better understanding of the invention reference should be had to the accompanying drawings wherein.

Figure 1A:
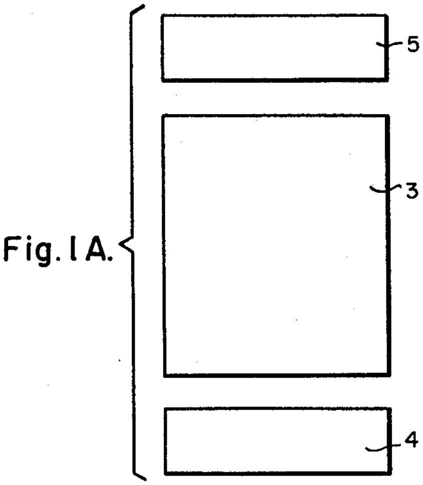
FIGURE 1A is a front view of apparatus showing some of the principles utilized in the present invention.
Figure 1B:
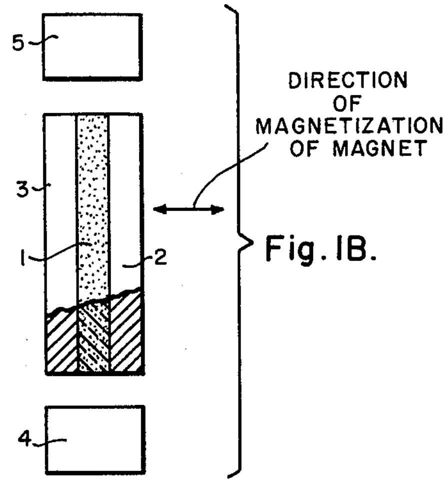
FIG. 1B is a right side view of the apparatus shown in FIG. 1A.

In FIGS. 1A and 1B there is shown a ceramic permanent magnet 1 used as a source of magnetomotive force sandwiched between two soft ferromagnetic bars 2 and 3.

The permanent magnet 1 is magnetized in a direction perpendicular to the soft magnetic bars 2 and 3. Two keepers 4 and 5 also made of soft magnetic materials are placed so that they may complete separate ferromagnetic paths through the common portion consisting of bars 2 and 3 and permanent magnet 1. The device comprising the ceramic permanent magnet 1 in the soft magnetic bars 2 and 3 is capable of holding a cold rolled low carbon steel keeper against the pole faces with the pole of approximately 26 pounds. The high course of force of the barium ferrite material permits the magnetic length to be smaller for the same pole than magnets of other materials. In addition, the flux density at the pole faces of the device shown in FIG. 1 can be raised to five times the flux density in the magnet by making the area of the pole face smaller than the magnetic area. The combination of these two design features yield a relatively small magnet which has a high flux density at the pole faces, but which has very little reach out power. As stated previously, the device can hold one keeper, for instance keeper 4 with a pull of approximately twenty-six pounds. If another keeper is placed on the magnetic structure in FIG. 1 such as keeper 5, it would not be held with much force (i.e. less than twenty-six pounds); that is it would be held with less force than the keeper 4 only if it were placed on the structure after keeper 4 had been placed on the device.

Figure 2A:
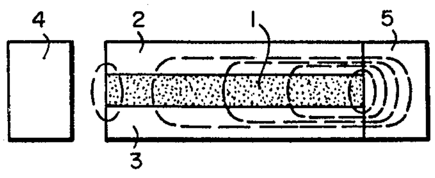
FIGS. 2A and 2B show the use of the apparatus shown in FIG. 1 in accordance with the principles utilized in the present invention.
Figure 2B:
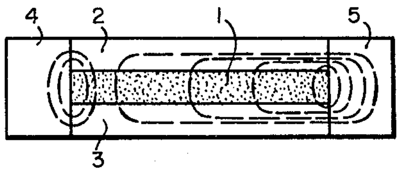

FIG. 2A shows what occurs when one keeper is placed on the device. In this figure, it can be seen that the domains on the soft magnetic material in the bars 2 and 3 have aligned themselves in the direction of the flux path including permanent magnet 1, bar 2, keeper 5 and bar 3. Very few lines of flux are present in the air gap between the keeper 4 and the device. In FIG. 2B there is shown what happens when the keeper 4 is placed against the device. Though there now appears to be two ferromagnetic paths which are physically and magnetically equal the flux does not divide equally between the two paths. The first path mentioned previously includes keeper 5 and the second path includes permanent magnet 1, bar 2, keeper 4 and bar 3. The domains of the soft magnetic material in bars 2 and 3 have aligned themselves in the direction of the path including keeper 5. Therefore, this is still the low reluctance path for the flux supplied by the permanent magnet 1 and very little will be supplied to the path including the keeper 4.

This device can be used to distinguish among four possible states of being, and one of those states has two alternatives of priority. The four states are (1) no keepers; (2) keeper 4 in contact with the device, keeper 5 not in contact with the device; (3) keeper 5 in contact with the device, keeper 4 not in contact with the device; (4) keepers 4 and 5 both in contact with the device. Two alternatives of priority for state (4) are: (*a*) keeper 5 placed before keeper 4, and (*b*) keeper 4 placed before keeper 5. In a sense, the above description qualifies as the design of a memory device or a storage element for digital information; i.e. the device remembers which keeper was placed on it first.

In FIG. 2B, if keeper 5 were removed, the domains would align in a path including keeper 4, and if keeper 5 was again placed against the device, it would be held with much less force than keeper 4.

Figures 3, 4, 5, 6:
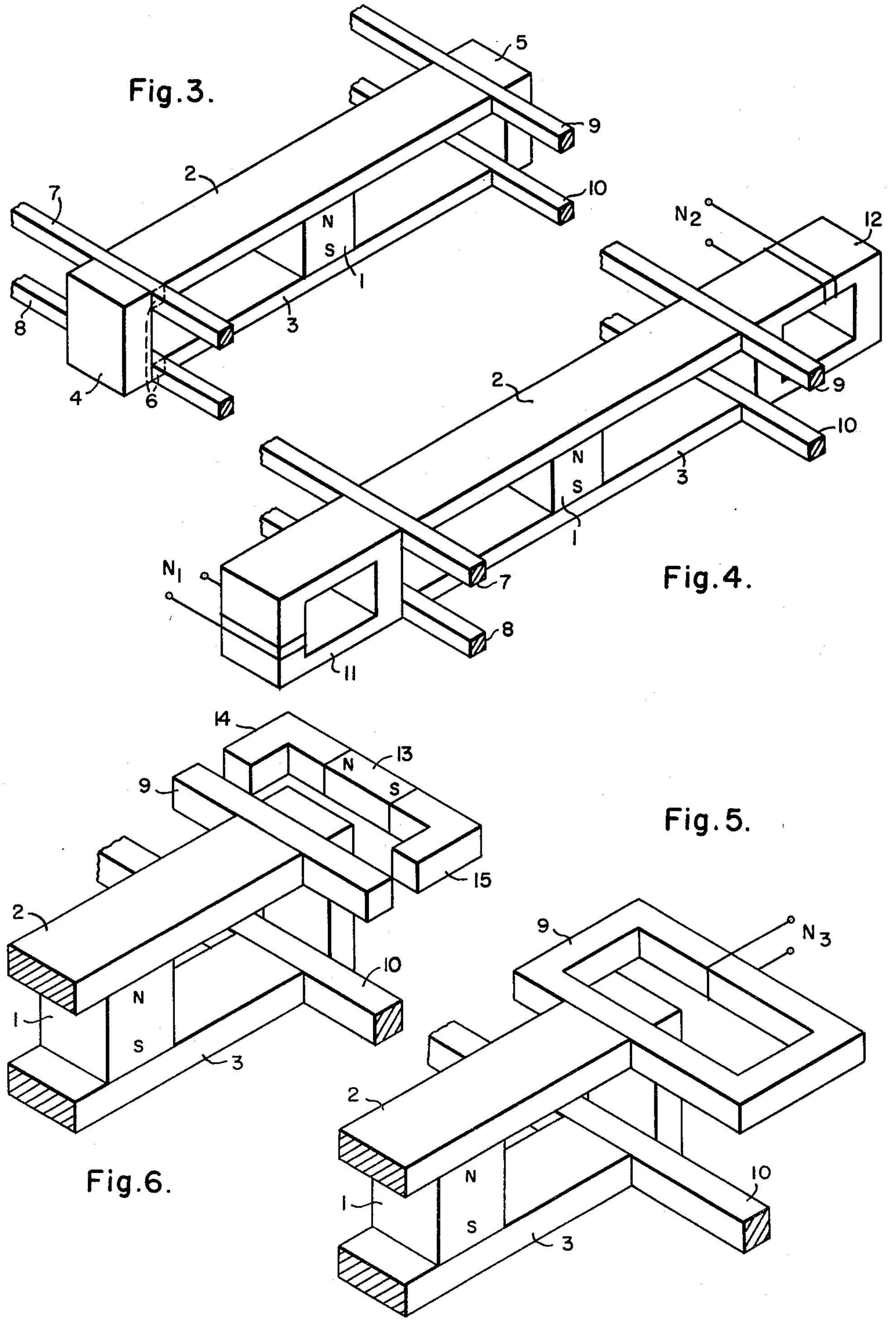
FIG. 3 shows the basic apparatus of the present invention.
FIG. 4 shows a different embodiment of the present invention using saturable reactor keepers.
FIG. 5 shows the apparatus of FIG. 3 with electromagnetic control.
FIG. 6 shows the apparatus of FIG. 3 with permanent magnetic control.

The control method proposed in the present invention uses magnetic means to control the effective reluctance of a zone of soft ferromagnetic material which is inserted between each bar and its corresponding keeper. The position of the controllable zone relative to the essential components shown in FIGS. 1A, 1B and 2A, 2B is shown in FIG. 3. The control mechanism involves the directivity of the domain structure within the ferromagnetic control element. Control bars 7 and 8 are placed between keeper 4 and bars 2 and 3 respectively. Where the bars 7 and 8 form part of the ferromagnetic path including keeper 4, there is present the control zones 6. The bars 7 and 8 are preferably made of the double oriented magnetic alloy discussed previously. Control bars 9 and 10 are also placed in a similar position between keeper 5 and bars 2 and 3, respectively. The control bars 9 and 10 are also made of the double oriented magnetic alloy. Each of the control bars 7, 8, 9 and 10 is connected to some source of magnetomotive force. This source will be discussed further with reference to FIGS. 5 and 6. In the absence of the supply of magnetomotive force to the control bars, the control zone exhibits low reluctance to the field of the permanent magnet 1. If magnetomotive force is supplied through the control bars to the control zone, the zone becomes saturated in a direction which is perpendicular to the permanet magnet field and offers relatively great reluctance to the permanent magnet field. If the control zones 6 are so saturated and no magnetomotive force is applied to the control bars 9 and 10, the predominant flux concentration is established in the path including permanent magnet 1, bar 2, control bar 9, keeper 5, control bar 10 and bar 3. Thus, the transfer of predominant flux concentration from one keeper path to the other keeper path is produced by saturating the magnetic material in the control zone. The direction of saturation is at right angles with the flux produced by the permanent magnet field.

The ability to transfer or switch the predominant flux path from one path to the other produces two useful effects. One effect concerns the difference in the flux density that exists in the parallel paths after each sucsive transfer. The second effect concerns the flux change which occurs during each transfer. The first effect can be used to produce switching devices of both mechanical and static variety. The mechanical varieties have keepers which correspond in function to the armature of a latching type relay or to the movable member of a latching type of push button. The static varieties have saturable reactor keepers.

FIG. 4 shows one method of using saturable reactor keepers with the present invention. In this device, the keepers 4 and 5 are replaced by saturable cores 11 and 12, respectively. The cores 11 and 12 have associated therewith control windings N1 and N2 connected to suitable excitation sources. In the device shown in FIG. 4, the transfer of the flux concentration is used to control (via magnetic saturation) the effective impedance of the windings N1 and N2 relative to the excitation source. The excitation source can be either a periodic alternating current source or a coded pulse source. The periodic alternating current source continuously monitors the state of the flux density in the saturable core. The pulse source can be coded to monitor the state of the flux density in the cores at specific times or intervals. This latter type of excitation could be used in a nondestructive readout computer element.

The control of these memory devices may be electromagnetic in nature. Such electromagnetic type control is shown in FIG. 5, wherein the control bar 9 is formed in a loop which is associated with an electromagnetic control winding N3. The control bar 9 is shown having minimum air gap. This tends to minimize the value of control MMF applied to the winding N3.

A second means of control uses a permanent magnet field to produce saturation at the control zone. Again the direction of this saturation is at right angles to the direction of the field of the permanent magnet 1. FIG. 6 shows a basic means of obtaining this type of saturation with permanent magnet sources. A permanent magnet 13 having pole pieces 14 and 15 is moved to open and close the air gap between control bar 9 to desaturate and saturate the control zone. Here, as in the previous embodiments, alternate application of the control sources for bars 7 and 10 (i.e. permanent magnet 13 and a similar source associated with control bar 7) produces transfer or redistribution of the stationary permanent magnet 1 field in the common portion of bars 2 and 3.

While a few embodiments of the invention have been illustrated and described in detail, it is particularly understood that the invention is not limited thereto or thereby.

I claim as my invention:

1. A magnetic memory device comprising magnetic means including a plurality of magnetic paths, a first source of magnetomotive force common to said plurality of paths for supplying magnetic flux thereto in accordance with the relative reluctance of each of said paths, one of said paths acquiring a different reluctance than the other of said path, and a second source of magnetomotive force to supply control flux in a quadrature spatial relationship to the flux supplied by said first source of magnetomotive force for changing the reluctance of the magnetic path acquiring the different reluctance by the saturation of a portion thereof.

2. A magnetic memory device operative in at least two stable memory states comprising, first magnetic means including a plurality of magnetic paths therein, a first source of magnetomotive force common to each of said paths to supply magnetic flux thereto in accordance with the relative reluctance of each of said paths, one of said paths acquiring a lower reluctance than the other of said paths to define one of the stable memory states of said device, said magnetic means including a second source of magnetomotive force to supply control flux in a quadrature spatial relationship to the flux supplied by said first source of magnetomotive force to increase the reluctance of the magnetic path acquiring the lower reluctance to define another stable memory state.

3. In a magnetic memory device, the combination of: magnetic means including a plurality of magnetic paths therein, a first source of magnetomotive force common to each of said paths to supply magnetic flux thereto in accordance with the relative reluctance of each of said paths, one of said paths acquiring a lower reluctance than the other of said paths, a second source of magnetomotive force including an electromagnetic winding disposed in at least one of said paths for providing control flux in a quadrature spatial relationship to the flux supplied by said first source of magnetomotive force to change the reluctance of the path acquiring the lower reluctance by saturating a portion thereof.

4. In a magnetic memory device operative in at least two stable magnetic memory states the combination of: first magnetic means including a plurality of magnetic paths, a source of magnetomotive force to supply magnetic flux to each of said paths in accordance with its relative reluctance, second magnetic means including a permanent magnet device for supplying control flux to at least one of said magnetic paths in a quadrature spatial relationship to the flux supplied by said source of magnetomotive force, said second magnetic means being movable so that a first magnetic memory state is defined with the second magnetic means away from its associated magnetic path having a lower reluctance than the other of said paths and with a second memory state being defined with said second magnetic means being adjacent the path having the lower reluctance so as to provide said control flux to saturate a portion of said path and increase the reluctance of that path to define a second memory state.

5. In a magnetic memory device the combination of: magnetic means including a plurality of magnetic paths therein, a first source of magnetomotive force common to each of said paths to supply magnetic flux thereto in accordance with the relative reluctance of each of said paths, one of said paths acquiring the lower reluctance than the other of said paths, a second source of magnetomotive force disposed to supply control flux in a quadrature spatial relationship to the flux supplied by said first source of magnetomotive force to increase the reluctance of the magnetic path acquiring the lower reluctance, and sensing means associated with at least one of said magnetic paths to sense changes in reluctance of that path.

6. In a magnetic memory device the combination of: magnetic means including a plurality of magnetic paths therein, a first source of magnetomotive force common to each of said paths for supplying magnetic flux thereto in accordance with the relative reluctance of each of said paths, one of said paths acquiring a lower reluctance than the other of said paths, a second source of magnetomotive force to supply flux in a quadrature spatial relationship to the flux supplied by said first source of magnetomotive force to increase the reluctance of the magnetic path acquiring the lower reluctance, and reluctance sensing means including a saturable reactor keeper disposed in at least one of said magnetic paths, said saturable reactor keeper having control windings supplied by an excitation source wherein changes of the reluctance of the path associated therewith changes the effective impedance of the control windings relative to the excitation source.

References Cited in the file of this patent

UNITED STATES PATENTS 2,805,407 Wallace ---------------- Sept. 3, 1957

FOREIGN PATENTS 1,274,561 France ---------------- Sept. 18, 1961